US010343180B2

(12) United States Patent
Rouyer et al.

(10) Patent No.: US 10,343,180 B2
(45) Date of Patent: Jul. 9, 2019

(54) CONTROL SYSTEM, SPRAY BAR, CARRIER AND METHOD OF IMPLEMENTATION (71) Applicant: EXEL INDUSTRIES, Epernay (FR)

(72) Inventors: Sébastien Rouyer, Vert Toulon (FR); Mathieu Mick, Chambrecy (FR)

(73) Assignee: EXEL INDUSTRIES, Epernay (FR)

( * ) Notice: Subject to any disclaimer, the term of this patent is extended or adjusted under 35 U.S.C. 154(b) by 0 days.

(21) Appl. No.: 15/550,695

(22) PCT Filed: Feb. 17, 2015

(86) PCT No.: PCT/FR2015/050386
§ 371 (c)(1),
(2) Date: Aug. 11, 2017

(87) PCT Pub. No.: WO2016/132023
PCT Pub. Date: Aug. 25, 2016

(65) Prior Publication Data
US 2018/0029060 A1   Feb. 1, 2018

(51) Int. Cl.
*A01M 7/00* (2006.01)
*B05B 12/12* (2006.01)
(Continued)

(52) U.S. Cl.
CPC ......... *B05B 12/124* (2013.01); *A01M 7/0053* (2013.01); *A01M 7/0057* (2013.01);
(Continued)

(58) Field of Classification Search
CPC .. A01M 7/005; A01M 7/0053; A01M 7/0057; B05B 1/20; B05B 13/005; B05B 12/124; A01C 23/008; A01B 63/1006
See application file for complete search history.

(56) References Cited

U.S. PATENT DOCUMENTS 5,048,292 A * 9/1991 Kubik ............... F15B 11/08
60/371
7,861,793 B2   1/2011 Murphy
(Continued)

FOREIGN PATENT DOCUMENTS

EP   1167095 A1   1/2002
FR    299412 A1   4/2014
(Continued)

OTHER PUBLICATIONS

International Search Report issued for PCT/FR2015/050386, dated May 19, 2015, 3 pages.
(Continued)

*Primary Examiner* — Alexander M Valvis
(74) *Attorney, Agent, or Firm* — Duane Morris LLP (57) ABSTRACT The present invention relates to a control system (20) provided to a spray bar (10) mounted on a carrier (1) at an angle ($\alpha 10$) adjustable relative to the carrier (1), the control system (20) comprising an actuator for changing the angle ($\alpha 10$) of the spray bar (10); a control device for controlling the actuator; and a damping device connected to the actuator to damp vibrations and oscillations of the spray bar (10) and thus stabilize the angle ($\alpha 10$). The invention is characterized in that the control system (20) further comprises a recharging device operating simultaneously with the control device to compensate for a pressure change in the damping device during a change in the angle ($\alpha 10$) of the spray bar (10). The invention also relates to a spray bar (10), a carrier (1) and a method of implementation.

9 Claims, 8 Drawing Sheets (51) Int. Cl.
  *B05B 1/20*    (2006.01)
  *B05B 13/00*   (2006.01)
  *F16F 15/023*  (2006.01)
  *A01C 23/00*   (2006.01)
(52) U.S. Cl.
  CPC .............. *B05B 1/20* (2013.01); *B05B 13/005* (2013.01); *F16F 15/023* (2013.01); *A01C 23/008* (2013.01); *F16F 2222/12* (2013.01); *F16F 2228/066* (2013.01)

(56) References Cited

U.S. PATENT DOCUMENTS

| | | |
|---|---|---|
| 2007/0289298 A1 | 12/2007 | Thompson et al. |
| 2009/0173802 A1* | 7/2009 | Theeuwen .......... A01C 23/008 239/164 |
| 2014/0196996 A1 | 7/2014 | Ito et al. |

FOREIGN PATENT DOCUMENTS

| | | |
|---|---|---|
| FR | 2996412 A1 | 4/2014 |
| JP | 3159296 B2 | 2/2001 |
| RU | 2396745 C2 | 7/2005 |
| SU | 548251 A1 | 2/1977 |
| UA | 2126 U | 9/2005 |

OTHER PUBLICATIONS

Search Report issued in connection with corresponding Russian Federation Patent Application No. 2017129076, dated Aug. 7, 2018, 2 pages.

\* cited by examiner

CONTROL SYSTEM, SPRAY BAR, CARRIER AND METHOD OF IMPLEMENTATION

CROSS-REFERENCE TO RELATED APPLICATIONS

The present application is U.S. national stage application under 35 U.S.C. § 371 of international patent application number PCT/FR2015/050386, filed Feb. 17, 2015, the entirety of which is incorporated herein by reference.

The present invention relates to a control system, provided to equip a spray bar mounted on a carrier and having an adjustable angle relative to the carrier and the ground. The invention also relates to a spray bar equipped with such a control system, a carrier equipped with such a spray bar, and a method for implementing such a control system. The invention relates to the field of agricultural spray bars.

When an agricultural vehicle equipped with a spray bar is called upon to work on irregular ground, for example comprising ruts, it is known to use a tilt bar to reposition the bar parallel to the ground. Furthermore, it is known to associate a shock absorbing device with the cylinder to lessen the oscillations of the bar due to the irregularities of the ground.

US-A-2014 196 996 describes an example control system of a spray bar. The control system comprises a tilt cylinder including two chambers separated by a piston. The control system also comprises a damping device, including two accumulators respectively connected to the two chambers of the cylinder. Each accumulator makes it possible to damp the pressure variations in the corresponding chamber.

The aim of the present invention is to propose an improved control system for a spray bar.

To that end, the invention relates to a control system, provided to equip a spray bar mounted on a carrier and having an adjustable angle relative to the carrier and the ground, the control system comprising an actuator for changing the angle of the spray bar; a control device for controlling the actuator; a damping device connected to the actuator to damp vibrations and oscillations of the spray bar and thus stabilize the angle; and a recharging device operating simultaneously with the control device to compensate for a pressure change in the damping device during a change in the angle of the spray bar.

Thus, the invention makes it possible to adjust the incline of the bar relative to the ground, damp the irregularities of the terrain and recharge the damping device each time the angle of the bar changes. In practice, this modification results from actuation of a tilt correction function.

According to other advantageous features of the invention, considered alone or in combination:

The modification of the angle of the spray bar results from a by operator manual actuation for a tilt correction function.

The modification of the angle of the spray bar results from an automatic actuation for a tilt correction function.

The recharging device comprises a distributor including a non-return position and a circulation position.

The recharging device also comprises a direct-action adjustable pressure limiter and a check valve, positioned in parallel relative to one another, and positioned in series relative to the distributor.

The recharging device is positioned downstream from the damping device, relative to the actuator.

The actuator is a through rod double-acting cylinder comprising a hollow body, a piston moving in the hollow body, a rod secured to the piston and extending on each side of the body, and two chambers separated by the piston in the body.

The actuator is formed by two single-acting cylinders mounted in opposition and having a same cross-section.

The damping device comprises two accumulators, each rechargeable by the recharging device in case of underpressure relative to the other accumulator.

The damping device comprises two all-or-nothing distributors, so as to activate or deactivate the damping.

The damping device comprises two proportional distributors, so as to adjust the damping hardness.

The invention also relates to a spray bar, suitable for being mounted on a carrier and having an adjustable angle, wherein the spray bar is equipped with a control system as described above.

The invention also relates to a carrier, for example a vehicle or an agricultural trailer, equipped with a spray bar as described above. The carrier may be self-propelled, carried or dragged.

The invention also relates to a method for implementing a control system as described above. The method comprises a tilting step for modifying the angle of the spray bar, wherein in the tilting step, the control device controls the actuator while the recharging device compensates for a pressure variation in the damping device. In this step, which results from the actuation of the tilt correction function, the recharging is done automatically and simultaneously with the control.

The invention will be better understood upon reading the following description, provided solely as a non-limiting example and done in reference to the appended drawings, in which.

Figure 1:
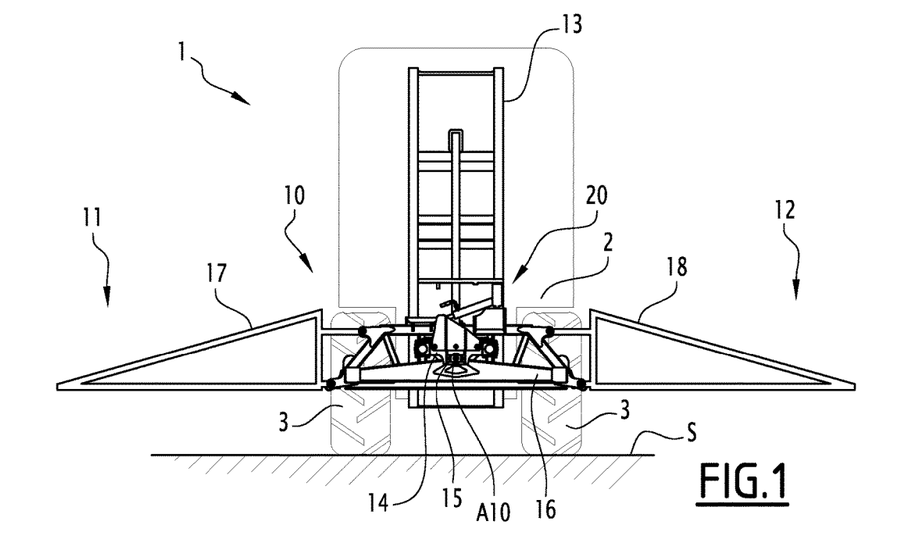
FIG. 1 is a rear view of a carrier according to the invention, of the agricultural vehicle type, equipped with a spray bar and a control system also according to the invention.
Figure 2:
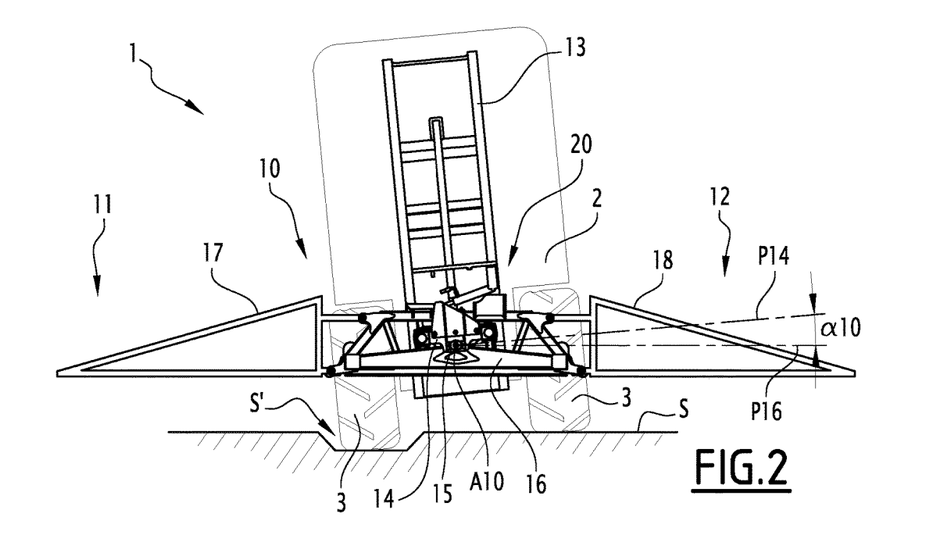
FIG. 2 is a view similar to FIG. 1, showing the spray bar inclined relative to the vehicle and the ground, while the vehicle has one wheel in a rut.
Figure 3:
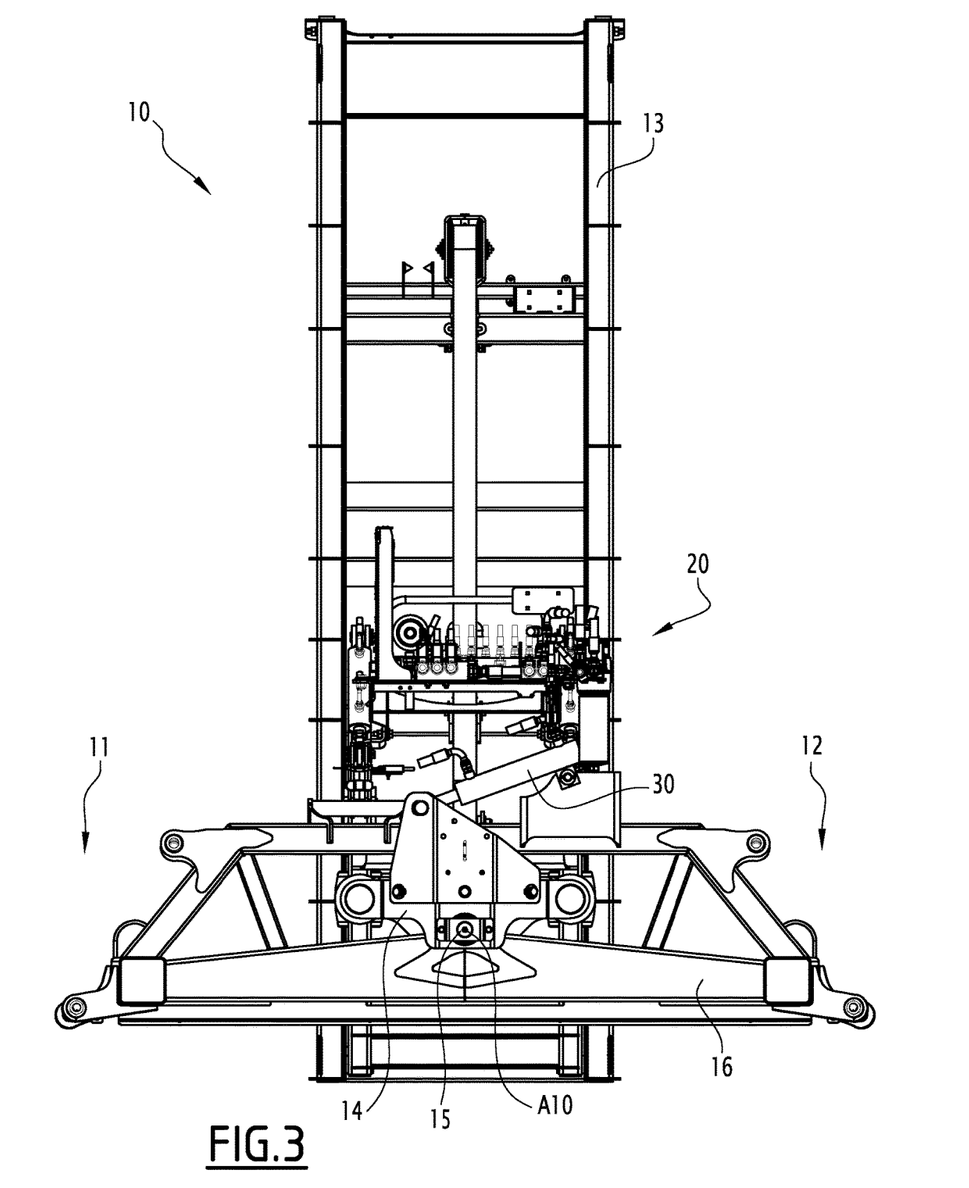
FIG. 3 is an enlarged partial rear view of the spray bar of FIGS. 1 and 2.
Figure 4:
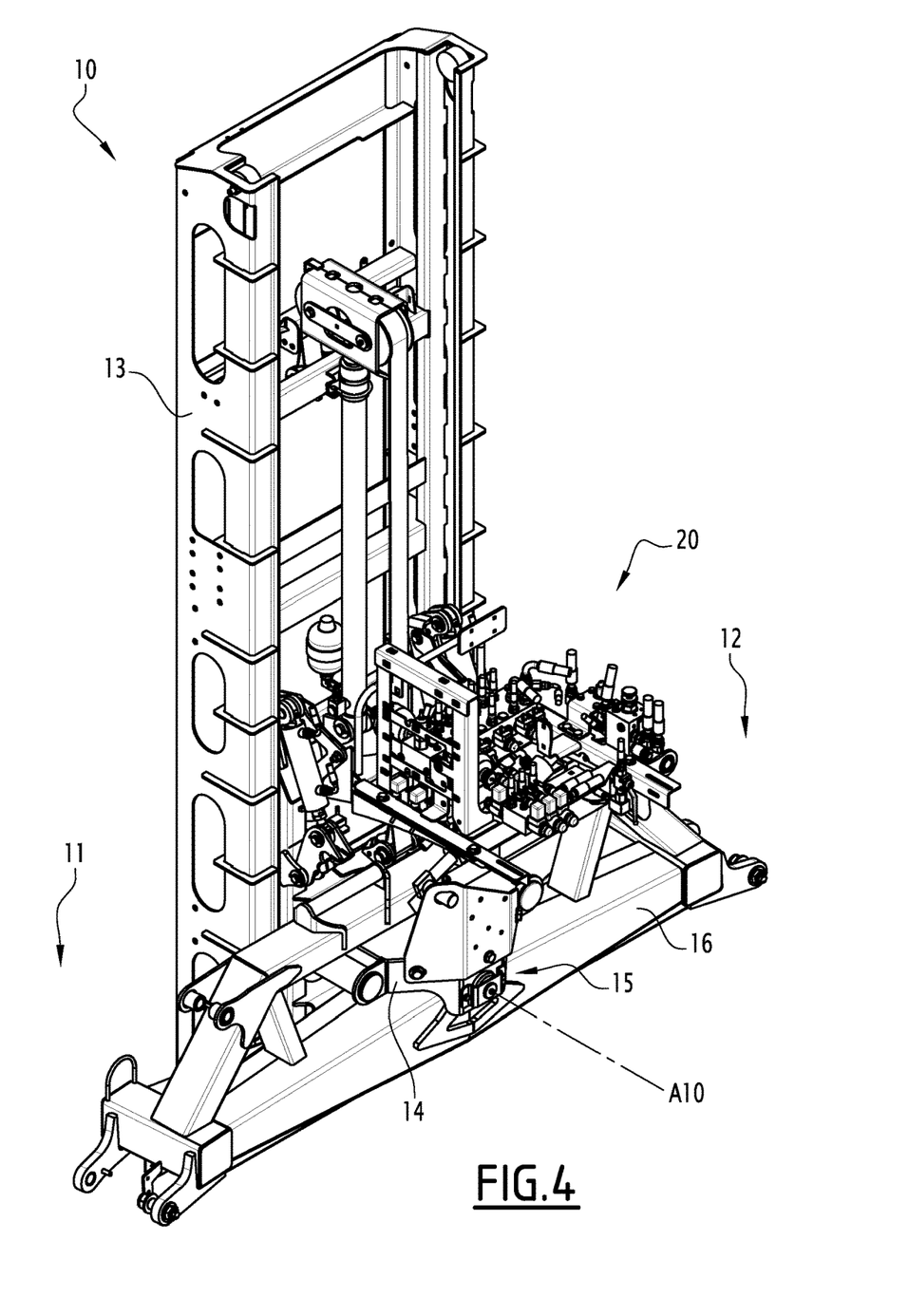
FIG. 4 is an enlarged partial rear view of the spray bar of FIGS. 1 and 2.
Figure 5:
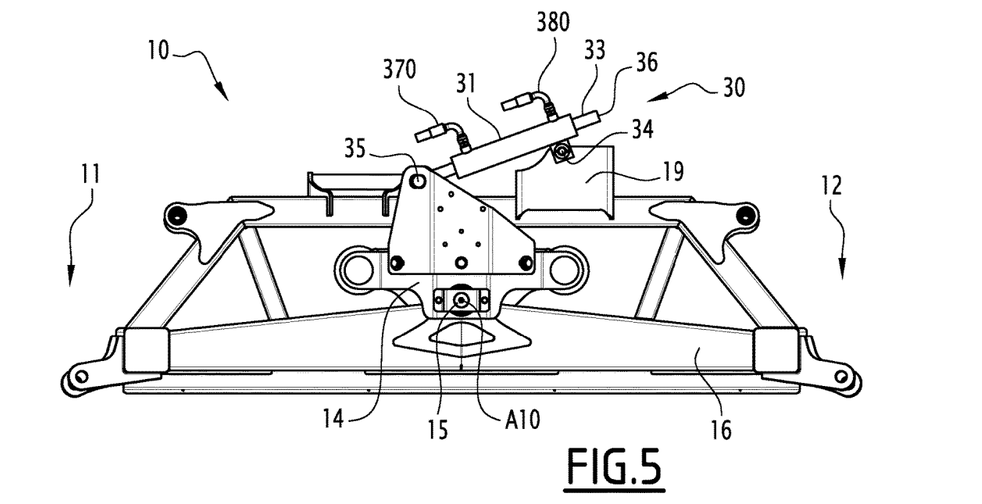
FIG. 5 is a rear view similar to FIG. 3, still more partial and on an even larger scale, of the spray bar and the control system.
Figure 6:
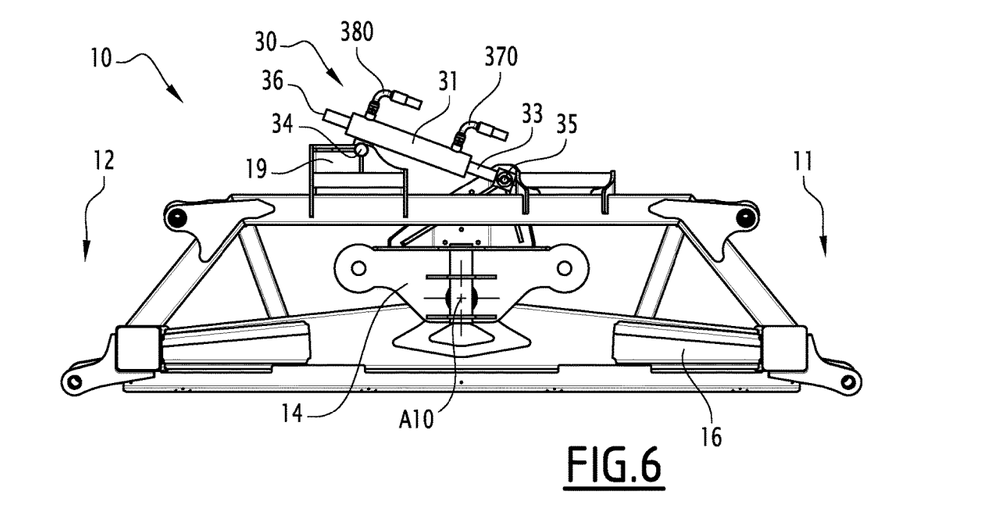
FIG. 6 is a front view similar to FIG. 5.

FIGS. 1 and 2 show a carrier according to the invention, of the agricultural vehicle type 1. Alternatively, the carrier can be of any other type suitable for the targeted application. The vehicle 1 comprises a chassis 2 and wheels 3 rotatable relative to the chassis 2. The wheels 3 are shown resting on the ground S, which is regular in FIG. 1 and includes a rut S' in FIG. 2.

The vehicle 1 is equipped with a spray bar 10, also according to the invention. For simplification reasons, the spray bar 10 and its component elements are partially shown in FIGS. 1 to 6.

The bar 10 extends along a horizontal direction between a left side 11 and a right side 12. The orientation of the sides 11 and 12 is defined relative to the direction of advance of the vehicle 1. The bar 10 comprises a stationary support 13, a moving carriage 14, an articulation 15, an inclinable part 16 and two spray arms 17 and 18. The support 13 is fastened to the chassis 2 of the vehicle 1. The carriage 14 is mounted slidingly connected on the support 13. The carriage 14 is movable along a vertical direction relative to the support 13, to lower or raise the arms 17 and 18. The inclinable part 16 is rotatable relative to the carriage 14 at the articulation 15, which defines a pivot axis A10 parallel to the longitudinal direction of the vehicle 1. The arms 17 and 18 extend on either side of the inclinable part 16, respectively on the sides 11 and 12 of the bar 10. The arms 17 and 18 are equipped with spraying devices, which are not the subject matter of the present invention. The size of the bar 10, measured between the ends of the arms 17 and 18 on the sides 11 and 12, is for example about 12 to 54 meters.

In the example of the figures, the bar 10 is positioned horizontally, with its arms 17 and 18 positioned parallel to the ground. The arms 17 and 18 can also be positioned vertically, or can be inclined with any possible orientation.

The bar 10 has an angle $\alpha$10 adjustable relative to the vehicle 1. The angle $\alpha$10 is embodied by an angle defined around the pivot axis A10, between a horizontal reference plane P14 associated with the carriage 14 and an inclinable plane P16 associated with the inclinable part 16 and the arms 17 and 18, as shown in FIG. 2. In the example of FIG. 2, the arm 17 is raised on the left side 11, while the arm 18 is lowered on the right side 12, to place the arms 17 and 18 parallel to the ground S.

The bar 10 is equipped with a hydraulic control system 20, designed in particular to adjust the angle $\alpha$10. Preferably in the context of the invention, the modification of the angle $\alpha$10 results from the manual actuation of a tilt correction function by the operator, directly from his cabin. According to one alternative embodiment, the modification of the angle $\alpha$10 may result from the automatic actuation of the tilt correction function, by a control unit, not shown.

The system 20 comprises a tilt cylinder 30, a control device 40, a damping device 60 and a recharging device 70. The cylinder 30 makes it possible to modify the angle $\alpha$10 of the bar 10, in other words to adjust the angle between the planes P14 and P16, through mechanical action of the rod 33 on the inclinable part 16. The device 40 makes it possible to control the cylinder 30 to incline the bar 10. The damping device 60 makes it possible to damp the vibrations and oscillations of the bar 10 when the vehicle 1 travels over irregular ground S, and thus to stabilize the angle $\alpha$10. The recharging device 70, activated simultaneously with the control device 40, makes it possible to compensate for a pressure change in the damping device 60 during a change in the angle $\alpha$10 of the bar 10.

The system 20 also performs other functions, not directly related to the subject matter of the present invention, but some of which are mentioned below. To that end, the system 20 comprises other devices, among which only the device 80 is shown for simplification reasons. These devices 80 and others can be controlled by the control device 40. The device 80 comprises an all-or-nothing distributor 81, a cylinder 82 and an accumulator 83. The device 80 makes it possible to move the carriage 14 relative to the support 13 by action of the cylinder 82. The other devices, not shown, in particular make it possible to unfold and refold the component parts of the arms 17 and 18, and to lock said component parts in position.

In the non-limiting example of FIGS. 1 to 10, the cylinder 30 is a through rod double-acting cylinder 33, also called dual rod. The cylinder 30 comprises a body 31, a piston 32 mounted translatably in the body 31, and the rod 33 secured to the piston 32. The rod 33 extends on either side of the piston 32, traverses the body 31 and exits at the ends of the body 31. The body 31 includes an extension 34 articulated on a platen 19 secured to the inclinable part 16. The rod 33 has one end 35 articulated on the carriage 14 and one free end 36. Two chambers 37 and 38 are defined in the body 31, on either side of the piston 32. The chambers 37 and 38 can be supplied with pressurized fluid via couplings 370 and 380, respectively, shown on the body 31. The pressure in the cylinder 30 depends on the size of the bar 10.

In case of overpressure in the left chamber 37 relative to the right chamber 38, the piston 32 and the rod 33 are pushed back on the right side 12. The end 35 of the rod 33 moves the moving part 16 and causes the angle $\alpha$10 to vary, such that the left arm 17 is raised while the right arm 18 is lowered.

In case of overpressure in the right chamber 38 relative to the left chamber 37, the piston 32 and the rod 33 are pushed back on the left side 11. The end 35 of the rod 33 moves the moving part 16 and causes the angle $\alpha$10 to vary, such that the left arm 17 is lowered while the right arm 18 is raised.

The control device 40 generates hydraulic energy making it possible to operate the system 20, in particular the cylinder 30. The device 40 comprises a pump 41, a reservoir 42, an input block 43 and a functional block 44. The reservoir 42 forms a fluid source within the system 20. The input block 43 includes an all-or-nothing distributor 45, provided to allow or prohibit the circulation of fluid between the pump 41, the reservoir 42 and the functional block 44. The functional block 44 includes various distributors associated with the functions of the system 20, including an inverter distributor 46, two all-or-nothing distributors 51 and 52, the distributor 81 connected to the cylinder 82, as well as other distributors associated with devices not shown equipping the system 20.

The device 40 also comprises two unidirectional flow limiters 57 and 58, inserted between the functional block 44 and the cylinder 30. More specifically, the limiter 57 is inserted between the distributor 51 and the coupling 370, while the limiter 58 is inserted between the distributor 52 and the coupling 380.

The damping device 60 comprises two accumulators 61 and 62, two all-or-nothing distributors 63 and 64, two check valves 65 and 66, and two two-way valves 67 and 68. The elements 61, 63, 65 and 67 are positioned on the left side 11, between the limiter 57, the coupling 370 and the system 70. The elements 62, 64, 66 and 68 are positioned on the right side 12, between the limiter 58, the coupling 380 and the system 70. Each accumulator 61 and 62 is in communication with one of the chambers 37 or 38, respectively, of the cylinder 30. Each accumulator 61 and 62 for example assumes the form of a nitrogen ball, forming a hydraulic damper.

In the example of the figures, each all-or-nothing distributor 63 and 64 includes a closed distributor portion 601 and an open distributor portion 602. The damper may or may not be activated, depending on the position 601 or 602 of the distributors 63 and 64. The damping is inactive in position 601 and active with a hardness unable to be altered by the operator in position 602.

According to one alternative not shown, the distributors 63 and 64 can be proportional distributors. The fluid circulation flow rate between each of the accumulators 61 and 62 and the corresponding chamber 37 or 38 of the cylinder 30 can be modified by the action of the two proportional distributors 63 and 64, which makes it possible to modify the hardness of the damper. Thus, the operator of the bar 10 can adjust the hardness of the damper as desired, for example as a function of the nature of the terrain, through manual controls. According to alternatives that are not shown, this command can be actuated in different ways and situated in different locations of the machine. In practice, the operator simultaneously modifies the position of each of the distributors 63 and 64 until obtaining the desired damping hardness.

The recharging device 70 comprises a distributor 71, including a non-return position 72 and a circulation position 73. The device 70 also comprises a direct-action adjustable pressure limiter 74 and a check valve 75, positioned in parallel relative to one another, and positioned in series relative to the distributor 71. The device 70 is positioned downstream from the device 60, relative to the actuator 30. If one of the accumulators 61 or 62 is at a different pressure from the other, the device 70 makes it possible to recharge this accumulator 61 or 62, so as to have a same pressure in the two accumulators 61 and 62 during a damping step.

The operation of the control system 20 is outlined below in reference to FIGS. 7 to 10.

Figure 7:
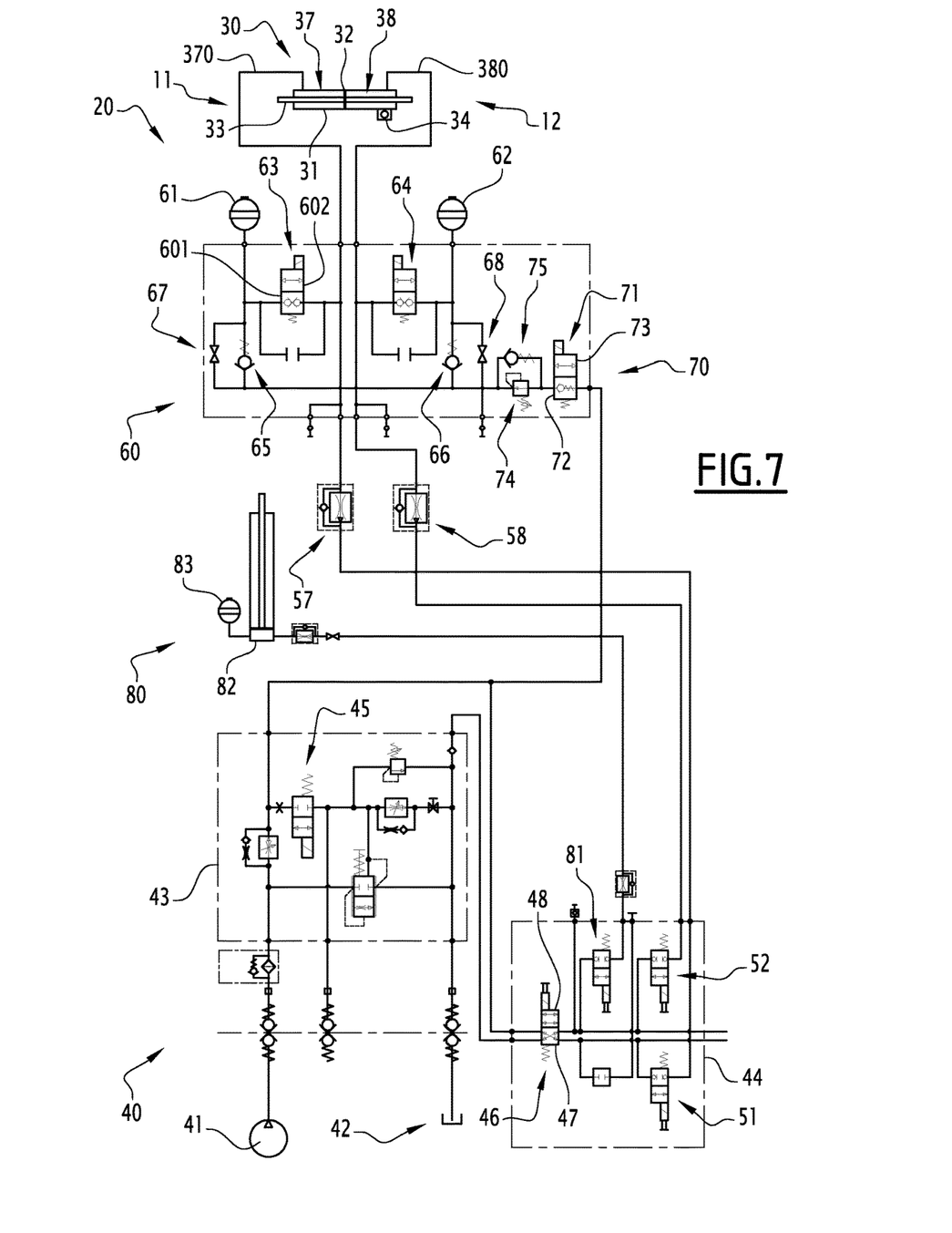
FIG. 7 is a hydraulic diagram of the control system of FIGS. 1 to 6.

FIG. 7 shows the system 20 when idle. The distributors 45, 51 and 52 are in the cut position. The distributor 71 is in the non-return position 72. The fluid does not circulate within the system 20.

Figure 8:
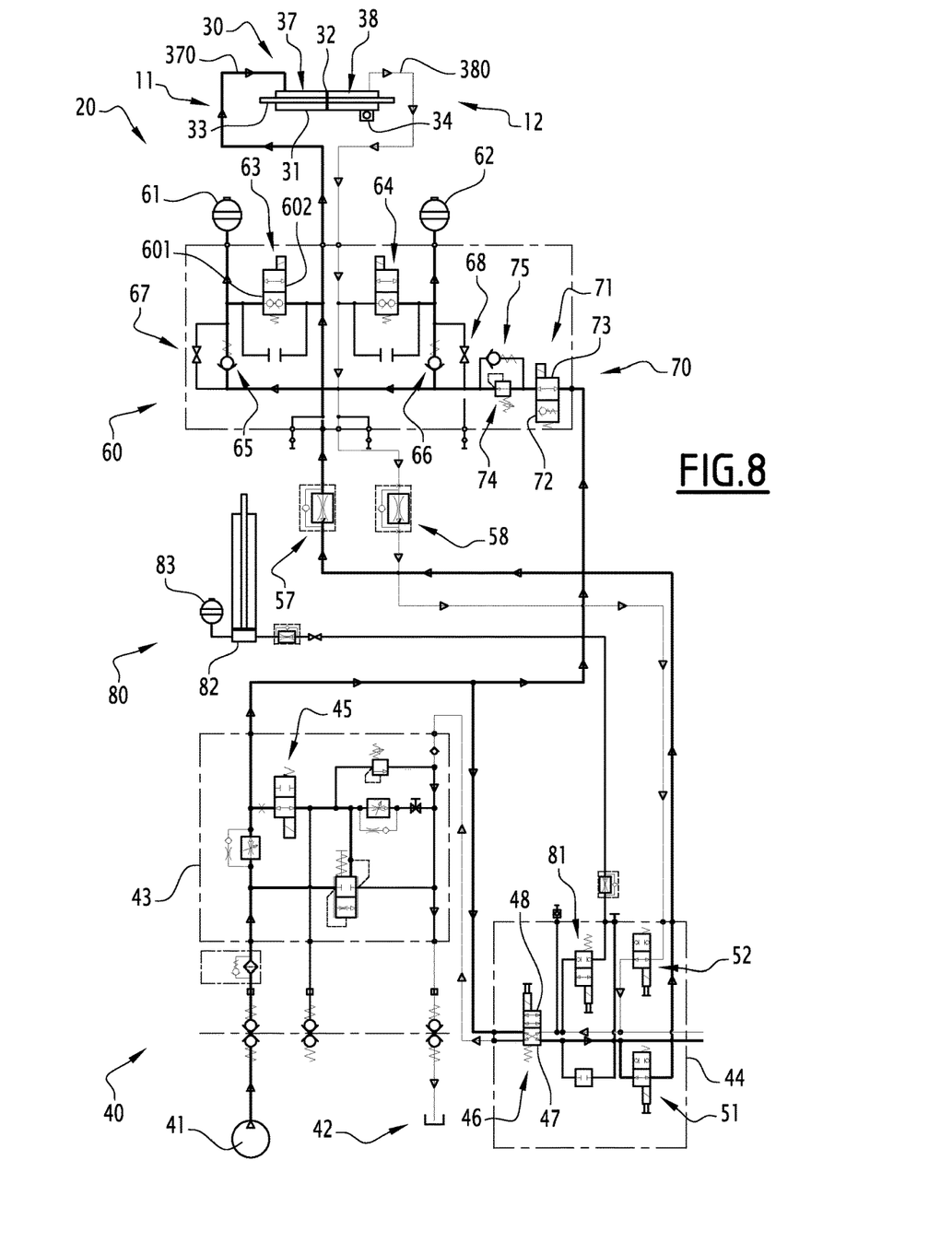
FIG. 8 is a diagram similar to FIG. 7, during the incline of the spray bar on a first side.
Figure 9:
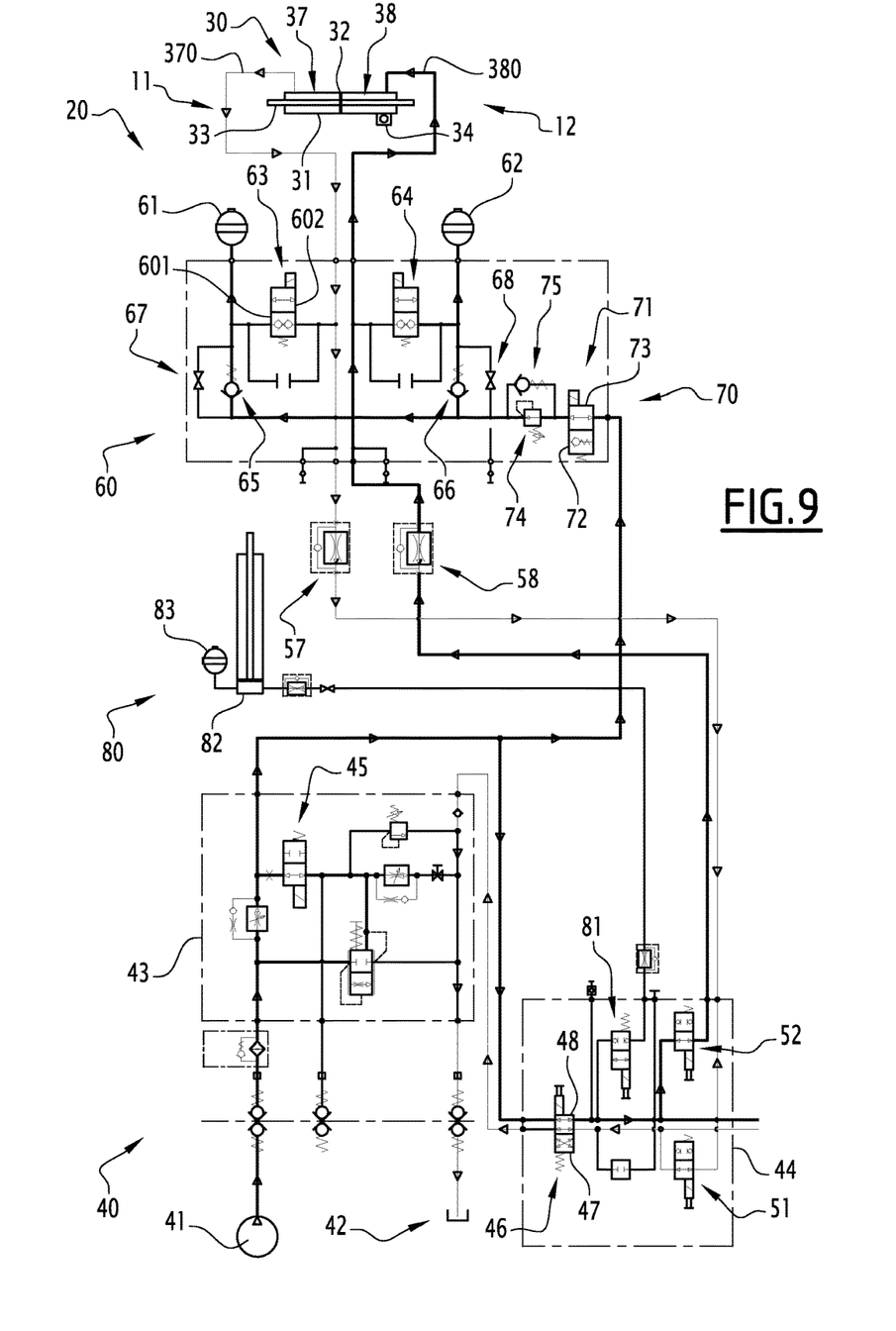
FIG. 9 is a diagram similar to FIG. 7, during the incline of the spray bar on a second side.

FIGS. 8 and 9 show the system 20 during a tilting step, i.e., a step for changing the angle $\alpha 10$ of the bar 10. The distributors 45, 51 and 52 are in the circulation position. The distributor 71 is also in the circulation position 73, to allow the recharging device 70 to perform its function. In practice, the tilting step is triggered manually by the operator from his cabin. According to a first embodiment, the operator can gradually modify the angle $\alpha 10$ until reaching a desired angle value $\alpha 10$. According to a second embodiment, the angle value $\alpha 10$ is adjusted automatically by a complementary device provided to that end, which is not the subject matter of the present invention.

During this tilting step, if one of the accumulators 61 or 62 has a pressure different from the other, this accumulator 61 or 62 is recharged by the recharging device 70, so as to have a pressure equilibrium in the two accumulators 61 and 62 at the end of actuation of the tilting function. Without this recharging, a pressure imbalance would appear between the two accumulators 61 and 62, respectively associated with the chambers 37 and 38 of the cylinder 30. The damping would then no longer be satisfactory and, in some cases, could cause an uncontrolled movement of the cylinder 30, and consequently of the arms 17 and 18.

In FIG. 8, the distributor 46 is in the circulation position 47. The pump 41 causes fluid to circulate, on the one hand, toward the recharging device 70, then the damping device 60, and on the other hand, toward the chamber 37 of the cylinder 30, while traversing the distributor 46, the distributor 51, the limiter 57 and the coupling 370. The chamber 37 experiences an overpressure relative to the chamber 38, such that the rod 33 is moved on the right side 12. Fluid contained in the chamber 38 escapes through the coupling 380, then traverses the limiter 58, the distributor 52, the distributor 46, to the reservoir 42. The angle $\alpha 10$ of the bar 10 is modified, before raising of the left arm 17 and lowering of the right arm 18.

In FIG. 9, the distributor 46 is in the circulation position 48. The pump 41 causes fluid to circulate, on the one hand, toward the recharging device 70, then the damping device 60, and on the other hand, toward the chamber 38 of the cylinder 30, while traversing the distributor 46, the distributor 52, the limiter 58 and the coupling 380. The chamber 38 experiences an overpressure relative to the chamber 37, such that the rod 33 is moved on the left side 11. Fluid contained in the chamber 37 escapes through the coupling 370, then traverses the limiter 57, the distributor 51, the distributor 46, to the reservoir 42. The angle $\alpha 10$ of the bar 10 is modified, before lowering of the left arm 17 and raising of the right arm 18.

Figure 10:
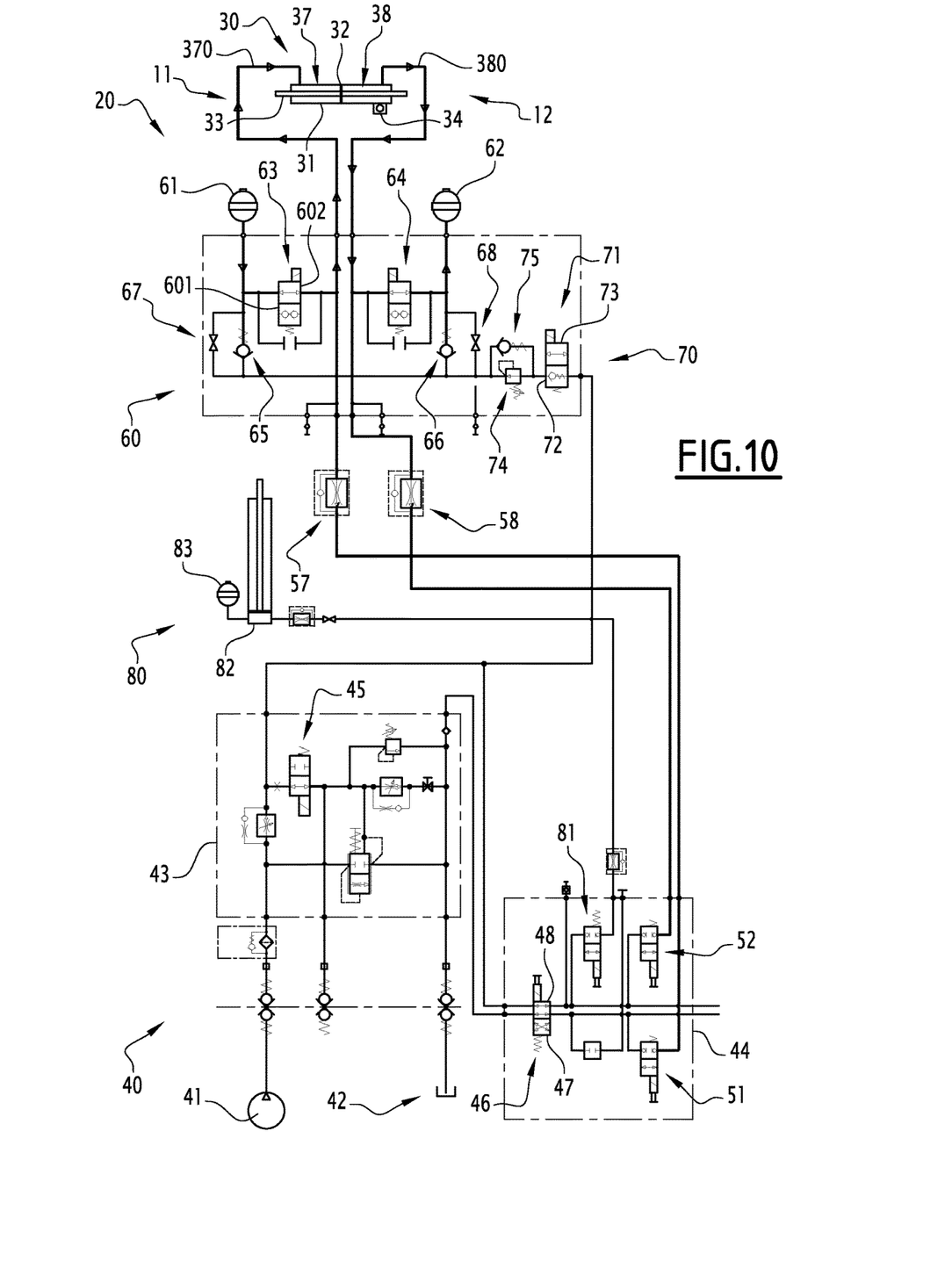
FIG. 10 is a diagram similar to FIG. 7, during the damping of the vibrations experienced by the bar.

FIG. 10 shows the system 20 during a damping step, when the bar 10 is in use, with a given angle $\alpha 10$. The distributors 51 and 52 are then in the cut position. The distributor 71 is in the non-return position 72, also corresponding to a cut position. The distributors 63 and 64 are in the circulation position 602.

While the tilting step is triggered manually by the operator, the damping step is triggered automatically, with no intervention by the operator, based on the vibrations and oscillations affecting the bar 10. In practice, the damping makes it possible to keep the incline $\alpha 10$ in a range having an amplitude depending on the size of the bar 10. As a non-limiting example, this range may be ±5° relative to the value defined during the tilting step.

In the simplified example of FIG. 10, mechanical stresses are exerted on the bar 10, tending to move the rod 33 toward the right side 12. The chamber 37 experiences an under pressure relative to the chamber 38. In response, fluid circulates from the accumulator 61 toward the chamber 37, while fluid circulates from the chamber 38 toward the accumulator 62, thus producing the damping of the movement of the arms 17 and 18.

During a subsequent tilting step, the recharging makes it possible to achieve a pressure equilibrium within the damping device 60. Without this recharging, a pressure imbalance would be maintained between the two accumulators 61 and 62 after the damping step, such that subsequent damping would no longer be satisfactory and, in some cases, could cause an uncontrolled movement of the cylinder 30, and consequently of the arms 17 and 18.

Furthermore, the vehicle 1, the spray bar 10 and/or the control system 20 can be configured differently from FIGS. 1 to 10 without going beyond the scope of the invention.

In an alternative that is not shown, the actuator 30 can be configured differently from a through rod double-acting cylinder. For example, the actuator 30 can be formed by two single-acting cylinders having a same cross-section and mounted in opposition.

According to another alternative that is not shown, the control device 40 can be configured differently than in the figures.

Furthermore, the technical features of the different embodiments and alternatives mentioned above can be combined with one another in whole or in part. Thus, the control system 20 can be adapted in terms of cost, functionality and performance.

The invention claimed is:
1. A control system, provided to equip a spray bar mounted on a carrier and having an adjustable angle relative to the carrier, the control system comprising:
  an actuator to change the angle of the spray bar;

a control device to control the actuator;

a damping device connected to the actuator to damp vibrations and oscillations of the spray bar and thus to stabilize the angle; and a recharging device operating simultaneously with the control device to compensate for a pressure change in the damping device during a change in the angle of the spray bar.

2. The control system according to claim 1, wherein the modification of the angle of the spray bar results from an operator manual actuation for a tilt correction function.

3. The control system according to claim 1, wherein the modification of the angle of the spray bar results from an automatic actuation for a tilt correction function.

4. The control system according to claim 1, wherein the recharging device is positioned downstream from the damping device, relative to the actuator.

5. The control system according to claim 1, wherein the actuator is a through rod double-acting cylinder comprising a hollow body, a piston moving in the hollow body, a rod secured to the piston and extending on each side of the body, and two chambers separated by the piston in the body.

6. The control system according to claim 1, wherein the actuator is formed by two single-acting cylinders mounted in opposition and having a same cross-section.

7. A spray bar, suitable for being mounted on a carrier and having an adjustable angle, wherein the spray bar is equipped with a control system according to claim 1.

8. A carrier equipped with a spray bar according to claim 7.

9. A method for implementing a control system according to claim 1, the method comprising a tilting step for modifying the angle of the spray bar, wherein in the tilting step, the control device controls the actuator while the recharging device compensates for a pressure variation in the damping device.

* * * * *